US007633950B2

(12) United States Patent
Molina

(10) Patent No.: US 7,633,950 B2
(45) Date of Patent: Dec. 15, 2009

(54) METHOD AND APPARATUS FOR AUTOMATICALLY ASSIGNING VIRTUAL CONCATENATION GROUP MEMBERS TO VIRTUAL CONCATENATION GROUPS

(75) Inventor: Angel Molina, Erlangen (DE)

(73) Assignee: Alcatel-Lucent USA Inc., Murray Hills, NJ (US)

( * ) Notice: Subject to any disclaimer, the term of this patent is extended or adjusted under 35 U.S.C. 154(b) by 685 days.

(21) Appl. No.: 11/088,376

(22) Filed: Mar. 24, 2005

(65) Prior Publication Data

US 2006/0218254 A1    Sep. 28, 2006

(51) Int. Cl.
*H04L 12/28* (2006.01)
*H04L 12/56* (2006.01)
*G06F 15/177* (2006.01)

(52) U.S. Cl. .................... 370/399; 370/389; 370/395.3; 709/221

(58) Field of Classification Search ................ 370/399, 370/389, 395.3; 709/220–222
See application file for complete search history.

*Primary Examiner*—Ronald Abelson
(74) *Attorney, Agent, or Firm*—Wall & Tong, LLP

(57) ABSTRACT

The invention comprises a method and apparatus for assigning at least one virtual concatenation group member to a virtual concatenation group at a terminating node. Specifically, the method comprises receiving originating configuration information comprising at least one assignment parameter and at least one originating capability parameter, identifying terminating configuration information associated with the terminating node where the terminating configuration information comprises at least one terminating capability parameter, comparing the at least one originating capability parameter to the at least one terminating capability parameter, and assigning the at least one virtual concatenation group member to the virtual concatenation group on the terminating node using the at least one assignment parameter in response to a determination that the at least one originating capability parameter and the at least one terminating capability parameter are compatible.

20 Claims, 3 Drawing Sheets

METHOD AND APPARATUS FOR AUTOMATICALLY ASSIGNING VIRTUAL CONCATENATION GROUP MEMBERS TO VIRTUAL CONCATENATION GROUPS

FIELD OF THE INVENTION

The invention relates to the field of communication networks and, more specifically, to virtual concatenation group member assignment.

BACKGROUND OF THE INVENTION

In general, next-generation networks (e.g., synchronous optical network (SONET)/synchronous digital hierarchy (SDH) networks) comprise various combinations of technologies, such as virtual concatenation (VCAT), generic frame processing (GFP), and the like. In VCAT, service signals to be transported over a transport technology (e.g., SONET/SDH) are inversely multiplexed onto a set of individual transport signals. The individual transport signals are independently transported over the network to a far-end network element which recovers the service signal from the transport signals. In VCAT, a virtual concatenation group (VCG) comprises a set of transport signals used to transport a service signal, and a VCG member comprises an individual transport signal from the set of transport signals.

In general, network elements supporting VCAT capabilities comprise units operable for supporting 1-64 VCGs (where each VCG comprises 1-256 VCG members). Furthermore, such network elements typically support 8-32 such units, thereby enabling a network element to support in excess of 2000 VCGs. In existing network elements, assignment of VCG members to VCGs is performed manually (i.e., by manual configuration). Furthermore, the provisioning must be performed consistently at both the originating end and the terminating end of a VCG in order to transport a service signal (i.e., inconsistent VCG configurations result in at least a partial loss of capacity available for transport of the service signal).

Unfortunately, as the number of VCGs (and, therefore, the number of VCG members) supported by network elements continues to grow, problems associated with manual VCG member assignments (e.g., increased effort, increased error probabilities, and the like) are exacerbated. Furthermore, such VCG member assignment problems are reencountered during service modifications, thereby resulting in increased operational cost, decreased network reliability, and the like.

SUMMARY OF THE INVENTION

Various deficiencies in the prior art are addressed through the invention of a method and apparatus for assigning at least one virtual concatenation group member to a virtual concatenation group. Specifically, a method according to one embodiment of the invention comprises receiving originating configuration information comprising at least one assignment parameter and at least one originating capability parameter, identifying terminating configuration information associated with the terminating node where the terminating configuration information comprises at least one terminating capability parameter, comparing the at least one originating capability parameter to the at least one terminating capability parameter, and assigning the at least one virtual concatenation group member to the virtual concatenation group on the terminating node using the at least one assignment parameter in response to a determination that the at least one originating capability parameter and the at least one terminating capability parameter are compatible.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention is discussed in the context of a communications network architecture comprising a core network and an associated plurality of access networks; however, the present invention can readily be applied to other networks and network topologies. In general, the present invention enables automated provisioning of virtual concatenation groups (VCGs) such that VCG members are automatically assigned to VCGs. In one embodiment, existing VCG member assignments are maintained according to configuration information. In another embodiment, existing VCG member assignments are automatically modified according to configuration information. As such, the invention obviates the need for manual assignment (and reassignment) of VCG members to associated VCGs, thereby reducing operational costs and increasing network reliability.

Figure 1:
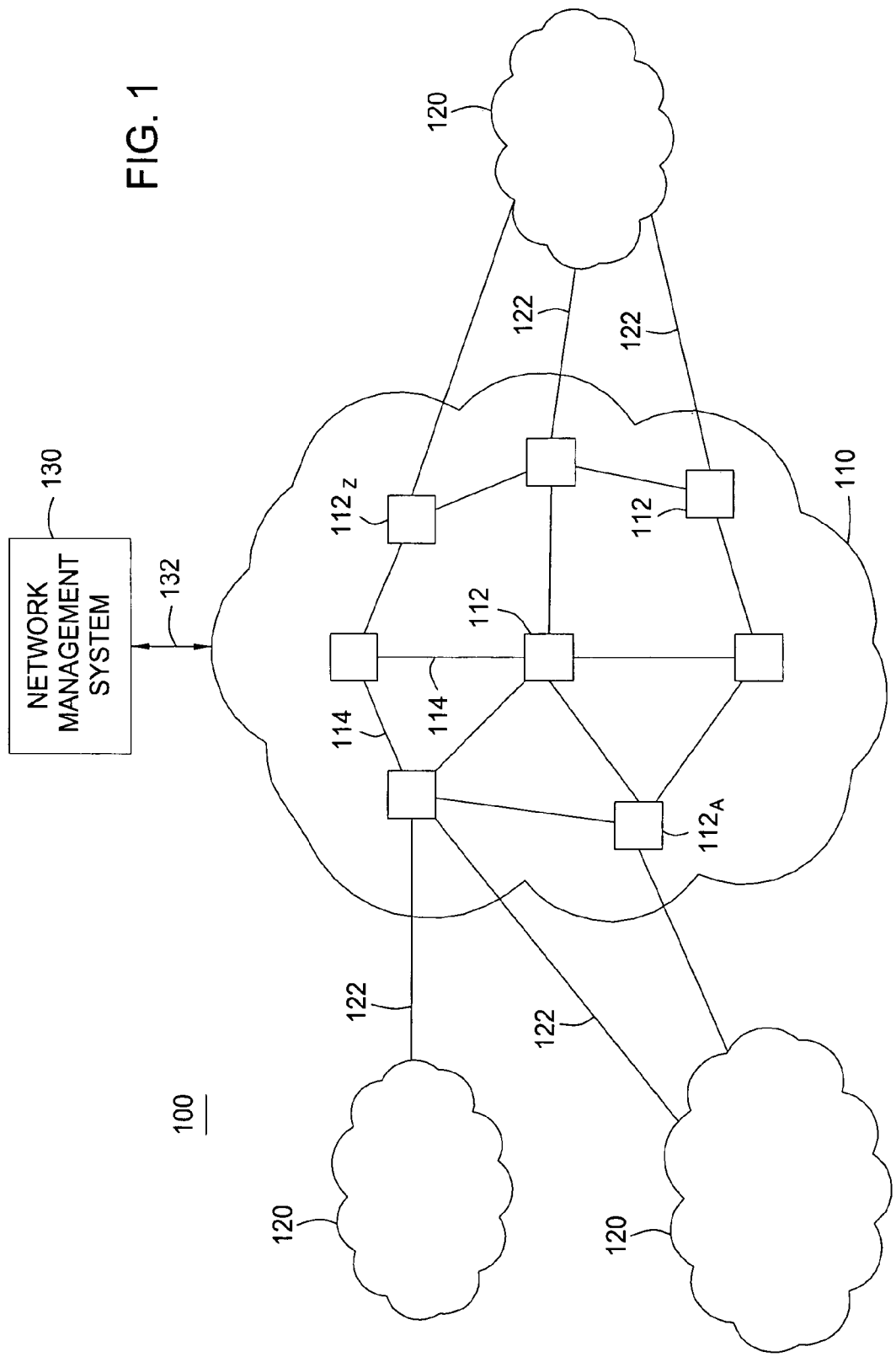
FIG. 1 depicts a high-level block diagram of a communications network architecture.

FIG. 1 depicts a high-level block diagram of a communications network architecture. More specifically, communications network architecture 100 of FIG. 1 comprises a core network (CN) 110, a plurality of access networks (ANs) 120 (collectively, ANs 120), and a network management system (NMS) 130. The CN 110 comprises a plurality of nodes 112 (collectively, nodes 112) in communication using a plurality of communication links (CLs) 114 (collectively, CLs 114). As depicted in FIG. 1, at least a portion of the nodes 112 communicate with the ANs 120 using a plurality of communication links (CLs) 122 (collectively, CLs 122).

As depicted in FIG. 1, ANs 120 comprise access networks operable for transmitting service signals to CN 110 for transporting the service signals over CN 110. Similarly, ANs 120 comprise access networks operable for receiving service signals from CN 110 following transport of the service signals over CN 110. As such, the ANs 120 comprises at least one of an asynchronous transfer mode (ATM) network, a frame relay (FR) network, an Internet Protocol (IP) network, an Ethernet network, a synchronous optical network (SONET) access network, a synchronous digital hierarchy (SDH) access network, and like access networks as known in the art.

As depicted in FIG. 1, CN 110 comprises a core network operable for transporting service signals between the ANs 120. In one embodiment, CN 110 utilizes various combinations of SONET/SDH technologies (e.g., VCAT, link capacity adjustment scheme (LCAS), generic frame processing (GFP), and like technologies as known in the art) for transporting service signals between the ANs 120. As such, in one embodiment, for example, the CN 110 comprises a SONET/

SDH network. In one such embodiment, next-generation SONET/SDH technologies (e.g., VCAT) support carrier-grade transport of SONET/SDH signals, Ethernet signals, and like service signals over fixed-rate carrier signals.

In VCAT, service signals identified for transport over a transport technology (e.g., SONET/SDH) are inversely multiplexed by an originating node (illustratively, one of the nodes 112) onto a set of individual path-level transport signals. The individual path-level transport signals are individually transported over the network to a terminating node (illustratively, one of the nodes 112) which recovers the service signal from the transport signal. In VCAT, the set of individual path-level transport signals is denoted as a virtual concatenation group (VCG), and each individual path level transport signal is denoted as a VCG member. The use of virtual concatenation for transport of service signals is well known in the art.

In general, the establishment of a unidirectional VCG connection for transporting a service signal comprises selecting (at an originating node) at least one VCG member for transporting the service signal and assigning the at least one VCG member to a VCG, selecting (at a terminating node) at least one VCG member for transporting the service signal and assigning the at least one VCG member to a VCG, and establishing connections between the originating node and terminating node for each VCG member assigned to the VCG. As such, as depicted in FIG. 1, each of the nodes 112 may operate as at least one of a VCG originating node and a VCG terminating node.

As such, in one embodiment, at least a portion of the nodes 112 are operable for implementing VCAT functions (and like functions, such as GFP, LCAS, and the like). For example, in one embodiment, each of the nodes 112 comprises units (e.g., 8 units, 16 units, 32 units, and the like) operable for supporting VCGs (e.g., 2 VCGs, 4 VCGs, 64 VCGs, and the like) where each VCG comprises VCG members (e.g., 63 VCG members per VCG, 255 VCG members per VCG, and the like). In other words, depending on node design and node hardware limitations, the nodes 112 are operable for transporting various numbers of VCGs and associated VCG members. As such, in one embodiment, at least a portion of the methodologies of the present invention are implemented by the nodes 112.

As depicted in FIG. 1, NMS 130 comprises a network management system in communication with CN 110 via a communication link (CL) 132. In one embodiment, for example, NMS 130 comprises at least one of a service provisioning system, a network management system, and like systems for managing communication networks, as known in the art. Furthermore, in one embodiment, NMS 130 comprises a system operable for performing virtual concatenation group member assignment processing. In one embodiment, NMS 130 performs out-of-band control channel establishment. As such, in one embodiment, at least a portion of the methodologies of the present invention are performed by NMS 130.

Although depicted as comprising specific numbers of CNs 110, nodes 112, CLs 114, ANs 120, CLs 122, NMSs 130, and CLs 132, those skilled in the art will appreciate the fewer or more CNs 110, nodes 112, CLs 114, ANs 120, CLs 122, NMSs 130, and CLs 1332 may be used. Similarly, CNs 110, nodes 112, CLs 114, ANs 120, CLs 122, NMSs 130, and CLs 132 may be deployed in various different configurations. Although described herein with respect to a SONET/SDH core network, in one embodiment, CN 110 comprises at least one of an optical transport network (OTN), a plesiochronous digital hierarchy (PDH) network, and like networks operable for supporting VCAT and like-type technologies. Furthermore, other networks, nodes, communication links, and the like may be utilized in support of the present invention.

Figure 2:
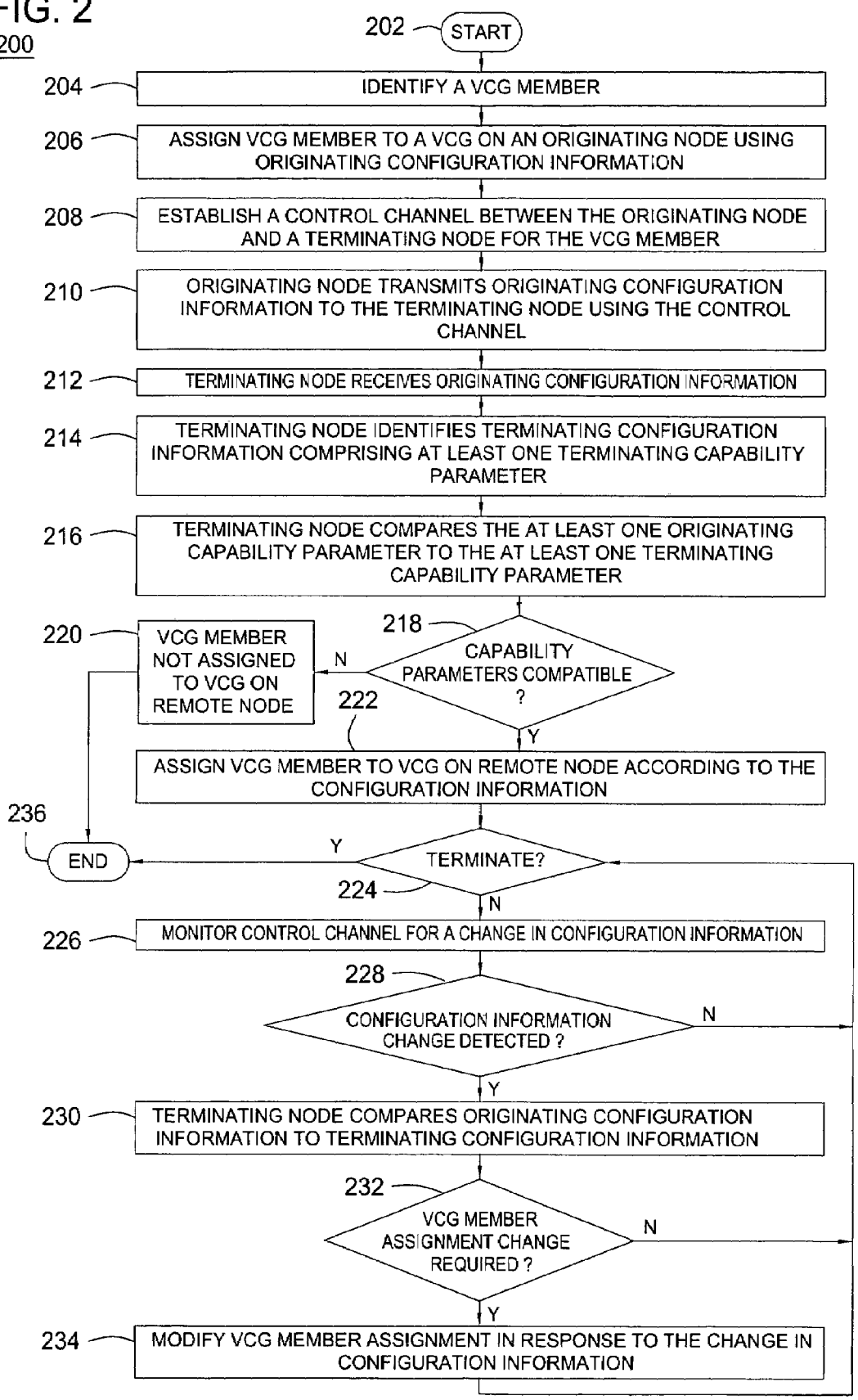
FIG. 2 depicts a flow diagram of a method according to one embodiment of the invention.

FIG. 2 depicts a flow diagram of a method according to one embodiment of the invention. Specifically, method 200 of FIG. 2 comprises a method for assigning at least one virtual concatenation group member to a virtual concatenation group. Although a portion of the steps are depicted as being performed serially, those skilled in the art will appreciate at least a portion of the steps of method 200 may be performed contemporaneously, as well as in a different order than presented in FIG. 2. Furthermore, although described herein with respect to a unidirectional VCG implementation, in one embodiment, the methodologies depicted and described with respect to FIG. 2 may be utilized for automated VCG member assignments in a bidirectional VCG implementation. The method 200 is entered at step 202 and proceeds to step 204.

At step 204, a VCG member is identified. In one embodiment, the VCG member is identified by a VCG originating node (i.e., an originating node). In one embodiment, a VCG member is identified using at least one provisioning message received by the originating node from a management system in communication with the originating node. In one embodiment, a plurality of VCG members is identified. For example, as depicted in FIG. 1, originating node $112_A$ identifies a VCG member using a provisioning message received by originating node $112_A$ from NMS 130.

At step 206, the VCG member is assigned to a VCG on the originating node. In one embodiment, the VCG member is assigned to the VCG using originating configuration information. In one embodiment, originating configuration information comprises at least one assignment parameter. In one such embodiment, an assignment parameter comprises at least one of an originating node identifier, a terminating node identifier, a virtual concatenation group identifier (i.e., VCG number), and a virtual concatenation group member identifier (i.e., VCG member number).

In one embodiment, originating configuration information comprises at least one originating capability parameter. In one such embodiment, an originating capability parameter is determined according to at least one of a local node hardware limitation, a local node capacity limitation, a local node VCG member assignment limitation, and like limitations. In one further embodiment, originating configuration information comprises at least one originating constraint (e.g., a service provider network operator limitation placed on assignment of VCG members to VCGs). In continuation of the above example, the VCG member is assigned as VCG member number 31 in VCG number 10 (denoted as VCG member 10-31).

At step 208, a control channel is established between the originating node and a VCG terminating node (i.e., a terminating node) for the VCG member. In one embodiment, a control channel is established for each VCG member associated with a VCG. In one embodiment, the control channel comprises one of a unidirectional control channel and a bidirectional control channel. In one embodiment, the control channel comprises at least one of an in-band control channel and an out-of-band control channel.

In one embodiment, in which the control channel comprises an in-band control channel, the control channel is implemented using at least one unused bit position in VCG member overhead associated with the VCG member. In another embodiment, in which the control channel comprises an out-of-band control channel, the control channel is established by a management system (illustratively, NMS 130). In continuation of the above example, an in-band, unidirectional control channel is established between originating node $112_A$ and terminating node $112_Z$.

At step 210, the originating node transmits originating configuration information to the terminating node using the control channel. At step 212, the terminating node receives the originating configuration information from the originating node. At step 214, the terminating node identifies terminating configuration information. In one embodiment, terminating configuration information comprises at least one terminating capability parameter. In one embodiment, a terminating capability parameter is determined according to at least one of a terminating node hardware limitation, a terminating node capacity limitation, a terminating node VCG member assignment limitation, and like limitations. In one further embodiment, terminating configuration information comprises at least one terminating constraint (e.g., a service provider network operator limitation placed on assignment of VCG members to VCGs). In continuation of the above example, originating node $112_A$ transmits originating configuration information to terminating node $112_Z$, and terminating node $112_Z$ identifies terminating configuration information.

At step 216, the terminating node compares the originating configuration information to terminating configuration information. As described herein, in one embodiment, remote configuration information comprises at least one terminating capability parameter. In one such embodiment, comparing the originating configuration information to the terminating configuration information comprises comparing the at least eon originating capability parameter to the at least one terminating capability parameter. In continuation of the above example, terminating node $112_Z$ compares the at least one originating capability parameter associated with originating node $112_A$ to the at least one terminating capability parameter associated with terminating node $112_Z$.

At step 218, a determination is made as to whether the originating configuration information and terminating configuration is compatible. In one embodiment, the determination as to whether the configuration information is compatible comprises a determination as to whether at least one originating capability parameter and at least one terminating capability parameter are compatible. If the capability parameters are not compatible, method 200 proceeds to step 220. At step 220, the assignment of the VCG member to the associated VCG is not performed. If the capability parameters are compatible, method 200 proceeds to step 222.

At step 222, the VCG member is assigned to the VCG. In other words, a binding of the VCG member to the associated VCG is established. In one embodiment, assigning of the VCG member to the VCG is performed in a manner tending to maximize a capacity available to transport at least one service signal using the virtual concatenation group member. In another embodiment, assigning of the VCG member to the VCG is performed in a manner tending to satisfy the at least one originating constraint and the at least one terminating constraint.

At step 224, a determination is made as to whether monitoring of the VCG member is terminated. In one embodiment, following completion of the automatic assignment of the VCG member to a VCG, monitoring of the VCG member is not performed. In one such embodiment, the control channel associated with the VCG is terminated. If monitoring of the VCG member is terminated, method 200 proceeds to step 232 where method 200 ends. In another embodiment, following completion of the automatic assignment of the VCG member to a VCG, monitoring of the VCG member is performed. If monitoring of the VCG member is not terminated, method 200 proceeds to step 226.

At step 226, monitoring for a change to at least one of the originating configuration information and the terminating configuration information is performed. In one embodiment, monitoring for a change to the originating configuration information and the terminating configuration is performed by at least one of the originating node and terminating node. In one embodiment, the control channel is monitored for a change to at least one of the originating configuration information and the terminating configuration information. In one such embodiment, monitoring for a change to configuration information is performed by at least one of the originating node and the terminating node.

At step 228, a determination is made as to whether a VCG member assignment change is required. If a VCG member assignment change is not required, method 200 returns to step 224. If a VCG member assignment change is required, method 200 proceeds to step 230. At step 230, the VCG member assignment is modified in response to the change to at least one of the originating configuration information and the terminating configuration information. In one embodiment, modification of the VCG member assignment is performed on at least one of the originating node and the terminating node. The method 200 then returns to step 224.

In one embodiment, modification of the VCG member assignment comprises reassigning the VCG member to a VCG member number other than the VCG member number to which the VCG member was originally assigned. For example, a VCG member comprising VCG member number 10 in VCG number 31 (denoted as VCG member 31-10) is reassigned to VCG member number 9 in VCG number 31 (denoted as VCG member 31-9). In another embodiment, modification of the VCG member assignment comprises assigning the VCG member to a VCG other than the VCG to which the VCG member was originally assigned. For example, a VCG member comprising VCG member number 10 in VCG number 31 (denoted as VCG member 31-10) is reassigned to VCG member number 12 in VCG number 18 (denoted as VCG member 18-12).

In one embodiment, as depicted and described herein with respect to FIG. 2, a VCG member is unidirectional. As such, as depicted and described with respect to FIG. 2, the originating node operates as a VCG originating node and the terminating node operates as a VCG terminating node. In another embodiment (not depicted), a VCG member is bidirectional. In this embodiment, the originating node depicted and described herein with respect to FIG. 2 operates as a VCG originating node for the VCG member forward path and operates as a VCG terminating node for the VCG member return path. Similarly, the terminating node depicted and described herein with respect to FIG. 2 operates a terminating node for the VCG member forward path and operates as a VCG originating node for the VCG member return path. In one such embodiment, configuration information is exchanged between the originating node and the terminating node using a bidirectional control channel.

As such, in an embodiment in which a VCG member is bidirectional, assignment of a VCG member to a VCG group in the VCG member forward path (e.g., from node $112_A$ to node $112_Z$) and assignment of a VCG member to a VCG group in the VCG member return path (e.g., from node $112_Z$ to node $112_A$) is substantially the same. In one such embodiment, the VCG member number assigned to the VCG member in the VCG forward path is identical to the VCG member number assigned to the VCG member in the VCG return path.

In one further embodiment, the VCG number to which the VCG member is assigned in the VCG forward path (i.e., on both the first node and the second node) is identical to the VCG number to which the VCG member is assigned in the VCG return path (i.e., on both the second node and the first node).

In one embodiment, the assignment of correspondence between VCG members and VCGs is flexible, thereby enabling the size of the VCGs (i.e., the number of VCG members assigned to a VCG) to be configured according to the service being transported. In other words, given a fixed number of VCGs and a fixed number of VCG members supported by a node (due to node hardware capabilities), flexible assignment (and reassignment) a VCG members to VCGs may be performed. Furthermore, in one embodiment, the present invention is independent of the associated GFP, LCAS, and like VCAT-related processing.

It is contemplated that at least a portion of the described functions may be combined into fewer functional elements. Similarly, it is contemplated that various functions may be performed by other functional elements, and that the various functions may be distributed across that various functional elements in a different manner. For example, at least a portion of functions of the present invention may be distributed across a portion of the nodes 112. Furthermore, although primarily described herein with respect to a SONET/SDH network, those skilled in the art will appreciate that the present invention may be used for performing automatic assignment of communication channels to associated communication channel groups in various other networks and network topologies.

Figure 3:
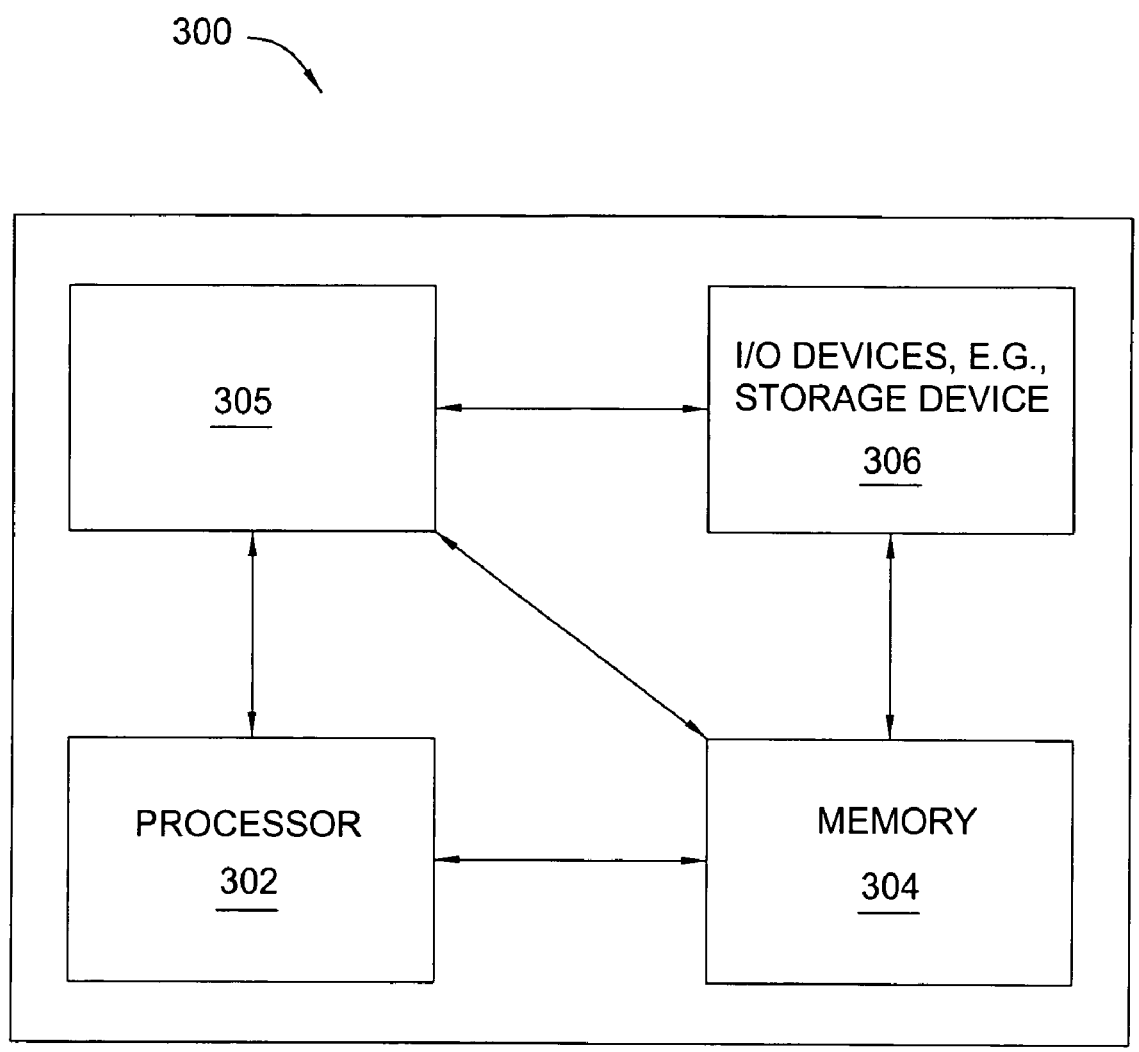
FIG. 3 depicts a high-level block diagram of a general purpose computer suitable for use in performing the functions described herein.

FIG. 3 depicts a high level block diagram of a general purpose computer suitable for use in performing the functions described herein. As depicted in FIG. 3, system 300 comprises a processor element 302 (e.g., a CPU), a memory 304, e.g., random access memory (RAM) and/or read only memory (ROM), a VCG member assignment module 305, and various input/output devices 306 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present VCG member assignment module or process 305 can be loaded into memory 304 and executed by processor 302 to implement the functions as discussed above. As such, the VCG member assignment process 305 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A method for assigning at least one virtual concatenation group member to a virtual concatenation group at a terminating node, said terminating node comprising a processor and a memory, said method comprising:

receiving, at said terminating node, originating configuration information comprising at least one assignment parameter and at least one originating capability parameter;

identifying terminating configuration information associated with said terminating node, said terminating configuration information comprising at least one terminating capability parameter;

comparing said at least one originating capability parameter to said at least one terminating capability parameter; and assigning said at least one virtual concatenation group member to said virtual concatenation group on said terminating node using said at least one assignment parameter to form at least one member assignment, said assigning performed in response to a determination that said at least one originating capability parameter and said at least one terminating capability parameter are compatible.

2. The method of claim 1, further comprising:

assigning said at least one virtual concatenation group member to said virtual concatenation group on an originating node using said at least one assignment parameter; and establishing at least one channel between said originating node and said terminating node for said at least one virtual concatenation group member, wherein said at least one channel conveys said originating configuration information from said originating node to said terminating node for said at least one virtual concatenation group member.

3. The method of claim 2, wherein said at least one channel comprises at least one of at least one unidirectional channel and at least one bidirectional channel.

4. The method of claim 2, wherein said at least one channel comprises at least one of at least one in-band channel and at least one out-of-band channel.

5. The method of claim 4, wherein at least one of said at least one in-band channel is implemented using at least one unused bit position in a virtual concatenation group member overhead portion associated with at least one of said at least one virtual concatenation group member.

6. The method of claim 1, wherein said assigning is performed in a manner tending to maximize a capacity available for transporting at least one service signal using said at least one virtual concatenation group member.

7. The method of claim 1, wherein said at least one assignment parameter comprises at least one of an originating node identifier, a terminating node identifier, a virtual concatenation group identifier, and a virtual concatenation group member identifier.

8. The method of claim 1, wherein said originating configuration information further comprises at least one originating constraint and said terminating configuration information further comprises at least one terminating constraint.

9. The method of claim 8, wherein said assigning is performed in a manner tending to satisfy said at least one originating constraint and said at least one terminating constraint.

10. The method of claim 1, further comprising:

modifying said at least one member assignment in response to a change in at least one of said originating configuration information and said terminating configuration information.

11. A computer readable storage medium storing software program, that, when executed by a computer, causes the computer to perform a method comprising:

receiving originating configuration information comprising at least one assignment parameter and at least one originating capability parameter;

identifying terminating configuration information associated with a terminating node, said terminating configuration information comprising at least one terminating capability parameter;

comparing said at least one originating capability parameter to said at least one terminating capability parameter; and assigning said at least one virtual concatenation group member to said virtual concatenation group on said terminating node using said at least one assignment parameter to form at least one member assignment, said assigning performed in response to a determination that said at least one originating capability parameter and said at least one terminating capability parameter are compatible.

12. The computer readable storage medium of claim 11, further comprising:

assigning said at least one virtual concatenation group member to said virtual concatenation group on an originating node using said at least one assignment parameter; and establishing at least one channel between said originating node and said terminating node for said at least one virtual concatenation group member, wherein said at least one channel conveys said originating configuration information from said originating node to said terminating node for said at least one virtual concatenation group member.

13. The computer readable storage medium of claim 12, wherein said at least one channel comprises at least one of at least one unidirectional channel and at least one bidirectional channel.

14. The computer readable storage medium of claim 12, wherein said at least one channel comprises at least one of at least one in-band channel and at least one out-of-band channel.

15. The computer readable storage medium of claim 14, wherein at least one of said at least one in-band channel is implemented using at least one unused bit position in a virtual concatenation group member overhead portion associated with at least one of said at least one virtual concatenation group member.

16. The computer readable storage medium of claim 11, wherein said assigning is performed in a manner tending to maximize a capacity available for transporting at least one service signal using said at least one virtual concatenation group member.

17. The computer readable storage medium of claim 11, wherein said at least one assignment parameter comprises at least one of an originating node identifier, a terminating node identifier, a virtual concatenation group identifier, and a virtual concatenation group member identifier.

18. The computer readable storage medium of claim 11, wherein said originating configuration information further comprises at least one originating constraint and said terminating configuration information further comprises at least one terminating constraint.

19. The computer readable storage medium of claim 11, further comprising:

modifying said at least one member assignment in response to a change in at least one of said originating configuration information and said terminating configuration information.

20. An apparatus for assigning at least one virtual concatenation group member to a virtual concatenation group at a terminating node, comprising:

means for receiving originating configuration information comprising at least one assignment parameter and at least one originating capability parameter;

means for identifying terminating configuration information associated with said terminating node, said terminating configuration information comprising at least one terminating capability parameter;

means for comparing said at least one originating capability parameter to said at least one terminating capability parameter; and means for assigning said at least one virtual concatenation group member to said virtual concatenation group on said terminating node using said at least one assignment parameter to form at least one member assignment, said assigning performed in response to a determination that said at least one originating capability parameter and said at least one terminating capability parameter are compatible.

* * * * *

UNITED STATES PATENT AND TRADEMARK OFFICE
CERTIFICATE OF CORRECTION

PATENT NO. : 7,633,950 B2  Page 1 of 1
APPLICATION NO. : 11/088376
DATED : December 15, 2009
INVENTOR(S) : Angel Molina It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1301 days.

Signed and Sealed this

Twenty-first Day of December, 2010

David J. Kappos
*Director of the United States Patent and Trademark Office*